United States Patent
Hayden et al.

(10) Patent No.: US 9,988,988 B2
(45) Date of Patent: Jun. 5, 2018

(54) CAMSHAFT SLIDER CONTROL SYSTEMS AND METHODS

(71) Applicant: GM Global Technology Operations LLC, Detroit, MI (US)

(72) Inventors: David N. Hayden, Ortonville, MI (US); Kevin Andrew Gady, Saline, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 404 days.

(21) Appl. No.: 14/951,562

(22) Filed: Nov. 25, 2015

(65) Prior Publication Data
US 2017/0122224 A1    May 4, 2017

Related U.S. Application Data

(60) Provisional application No. 62/247,840, filed on Oct. 29, 2015.

(51) Int. Cl.
| | | |
|---|---|---|
| *F02D 13/02* | (2006.01) | |
| *F02D 17/00* | (2006.01) | |
| *F02D 41/00* | (2006.01) | |
| *F01L 1/047* | (2006.01) | |
| *F01L 13/00* | (2006.01) | |

(52) U.S. Cl.
CPC .......... *F02D 13/0211* (2013.01); *F01L 1/047* (2013.01); *F01L 13/0036* (2013.01); *F02D 17/00* (2013.01); *F02D 41/0082* (2013.01); *F01L 2001/0473* (2013.01); *F01L 2013/0052* (2013.01); *F01L 2013/0078* (2013.01); *F02D 2041/001* (2013.01); *F02D 2041/0012* (2013.01); *Y02T 10/18* (2013.01)

(58) Field of Classification Search
CPC .. F02D 13/0211; F02D 13/0246; F02D 13/06; F02D 17/02; F02D 41/0082; F02D 41/0087; F02D 2041/001; F02D 2041/0012; F01L 2001/0473; F01L 13/0036; F01L 2013/001; F01L 2013/0052; F01L 2013/0078
See application file for complete search history.

(56) References Cited

U.S. PATENT DOCUMENTS

| | | | | |
|---|---|---|---|---|
| 2014/0137819 A1* | 5/2014 | McConville | ........ | F01L 13/0036 123/90.6 |
| 2014/0158073 A1* | 6/2014 | Doering | ............ | F01L 1/04 123/90.1 |
| 2014/0196703 A1* | 7/2014 | Boyer | ........... | F02D 41/0055 123/568.21 |

* cited by examiner

*Primary Examiner* — Stephen K Cronin
*Assistant Examiner* — Anthony L Bacon

(57) ABSTRACT

A slider control module, based on a mode command: selectively extends pins into one or more slider actuators of a camshaft slider. Contact between the pins and the grooves in the slider actuator(s) during rotation of a camshaft slides the camshaft slider axially along the intake camshaft. An actual mode module: determines a last stored indicator of the mode command; commands the slider control module to extend one of the pins to slide the camshaft slider and achieve the last stored indicator of the mode command; and, based on whether the one of the pins extended in response to the command, indicates that an actual mode is either: (i) the last stored indicator of the mode command; or (ii) another mode. The mode command module updates the mode command to the actual mode.

26 Claims, 8 Drawing Sheets

CAMSHAFT SLIDER CONTROL SYSTEMS AND METHODS

CROSS-REFERENCE TO RELATED APPLICATIONS

This application claims the benefit of U.S. Provisional Application No. 62/247,840, filed on Oct. 29, 2015. The disclosure of the above application is incorporated herein by reference in its entirety.

FIELD

The present disclosure relates to internal combustion engines, and more particularly to systems and methods for controlling camshaft sliders.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles include an internal combustion engine that generates drive torque. More specifically, an intake valve is selectively opened to draw air into a cylinder of the engine. The air mixes with fuel to form an air/fuel mixture that is combusted within the cylinder. The air/fuel mixture is compressed and combusted to drive a piston within the cylinder. An exhaust valve selectively opens to allow the exhaust gas resulting from combustion to exit the cylinder.

Under some circumstances, one or more cylinders of an engine may be deactivated. Deactivation of a cylinder may include deactivating the opening and closing of intake valves of the cylinder and halting fueling of the cylinder. One or more cylinders may be deactivated, for example, to decrease fuel consumption when the engine can produce a requested amount of torque while the one or more cylinders are deactivated.

A rotating camshaft regulates the opening and closing of the intake and/or exhaust valves. The camshaft includes cam lobes that are fixed to and rotate with the camshaft. The geometric profile of a cam lobe generally controls the period that the valve is open (duration) and the magnitude or degree to which the valve opens (lift). The vehicle may switch between various lift states (e.g., high, low, and deactivation) with the implementation of a sliding camshaft to maximize engine performance while maintaining optimal fuel efficiency. Actuators, such as solenoids, may be utilized to command the sliding operation of the camshaft.

SUMMARY

In a feature, a camshaft slider control system of an engine of a vehicle is described. A mode command module selectively sets an intake mode command to one of: a deactivation mode; a low lift mode; and a high lift mode. A slider control module, based on the intake mode command: selectively extends a first pin of a first slider actuator into a first groove of a first grooved member of an intake camshaft slider, wherein contact between the first pin and the first groove during rotation of an intake camshaft slides the intake camshaft slider in a first direction axially along the intake camshaft; and selectively extends a second pin of a second slider actuator into a second groove of a second grooved member of the intake camshaft slider, wherein contact between the second pin and the second groove during rotation of the intake camshaft slides the intake camshaft slider in a second direction axially along the intake camshaft. An actual mode module: determines a last stored indicator of the intake mode command; commands the slider control module to extend one of the first and second pins to slide the intake camshaft slider and achieve the last stored indicator of the intake mode command; and based on whether the one of the first and second pins extended in response to the command, indicates that an actual intake mode is either: (i) the last stored indicator of the intake mode command; or (ii) another one of the deactivation, low lift, and high lift modes. The mode command module updates the intake mode command to the actual intake mode.

In further features, the actual mode module determines whether the one of the first and second pins extended based on signals from at least one sensor associated with the one of the first and second pins.

In further features, the at least one sensor includes at least one of a Hall Effect sensor and a back electromagnetic force (EMF) sensor.

In further features, the actual mode module determines that the one of the first and second pins extended when a change in the signals is greater than a predetermined value.

In further features, the actual mode module further: in response to a determination that the one of the first and second pins extended in response to the command to extend the one of the first and second pins, issues a second command the slider control module to extend the one of the first and second pins to slide the intake camshaft slider and achieve the last stored indicator of the intake mode command; and indicates that the actual intake mode is the last stored indicator of the intake mode command when the one of the first and second pins did not extend in response to the second command to extend the one of the first and second pins.

In further features, the actual mode module further: in response to a determination that the one of the first and second pins extended in response to the command to extend the one of the first and second pins, issues a second command the slider control module to extend the one of the first and second pins to slide the intake camshaft slider and achieve the last stored indicator of the intake mode command; and indicates that the actual intake mode is the last stored indicator of the intake mode command when the one of the first and second pins did extend in response to the second command to extend the one of the first and second pins.

In further features, the actual mode module determines the one of the first and second pins to extend based on the last stored indicator of the intake mode command.

In a feature a camshaft slider control system of an engine of a vehicle is described. A mode command module selectively sets an exhaust mode command to one of: a deactivation mode; a non-deactivation lift mode. A slider control module, based on the exhaust mode command: selectively extends a first pin of a slider actuator into a first groove of a grooved member of an exhaust camshaft slider, wherein contact between the first pin and the first groove during rotation of an exhaust camshaft slides the exhaust camshaft slider in a first direction axially along the exhaust camshaft; and selectively extends a second pin of the slider actuator into a second groove of the grooved member of the exhaust camshaft slider, wherein contact between the second pin and the second groove during rotation of the exhaust camshaft slides the exhaust camshaft slider in a second direction axially along the exhaust camshaft. An actual mode module: determines a last stored indicator of the exhaust mode command; commands the slider control module to extend one of the first and second pins to slide the exhaust camshaft slider and achieve the last stored indicator of the exhaust mode command; and indicates that an actual exhaust mode is the last stored indicator of the exhaust mode command when the one of the first and second pins did not extend in response to the command to extend the one of the first and second pins. The mode command module updates the exhaust mode command to the actual exhaust mode.

In further features, the actual mode module determines whether the one of the first and second pins extended based on signals from at least one sensor associated with the one of the first and second pins.

In further features, the at least one sensor includes at least one of a Hall Effect sensor and a back electromagnetic force (EMF) sensor.

In further features, the actual mode module determines that the one of the first and second pins extended when a change in the signals is greater than a predetermined value.

In further features, the actual mode module indicates that the actual exhaust mode is the one of the deactivation and non-deactivation modes when the one of the first and second pins extended in response to the command to extend the one of the first and second pins.

In further features, the actual mode module determines the one of the first and second pins to extend based on the last stored indicator of the exhaust mode command.

In a feature, a camshaft slider control method for an engine of a vehicle is described. The camshaft slider control method includes: selectively setting an intake mode command to one of: a deactivation mode; a low lift mode; and a high lift mode; based on the intake mode command: selectively extending a first pin of a first slider actuator into a first groove of a first grooved member of an intake camshaft slider, wherein contact between the first pin and the first groove during rotation of an intake camshaft slides the intake camshaft slider in a first direction axially along the intake camshaft; and selectively extending a second pin of a second slider actuator into a second groove of a second grooved member of the intake camshaft slider, wherein contact between the second pin and the second groove during rotation of the intake camshaft slides the intake camshaft slider in a second direction axially along the intake camshaft. The camshaft slider control method also includes: determining a last stored indicator of the intake mode command; commanding extension of one of the first and second pins to slide the intake camshaft slider and achieve the last stored indicator of the intake mode command; based on whether the one of the first and second pins extended in response to the command, indicating that an actual intake mode is either: (i) the last stored indicator of the intake mode command; or (ii) another one of the deactivation, low lift, and high lift modes; and updating the intake mode command to the actual intake mode.

In further features, the camshaft slider control method further includes determining whether the one of the first and second pins extended based on signals from at least one sensor associated with the one of the first and second pins.

In further features, the at least one sensor includes at least one of a Hall Effect sensor and a back electromagnetic force (EMF) sensor.

In further features, the camshaft slider control method further includes determining that the one of the first and second pins extended when a change in the signals is greater than a predetermined value.

In further features, the camshaft slider control method further includes: in response to a determination that the one of the first and second pins extended in response to the command to extend the one of the first and second pins, issuing a second command to extend the one of the first and second pins to slide the intake camshaft slider and achieve the last stored indicator of the intake mode command; and indicating that the actual intake mode is the last stored indicator of the intake mode command when the one of the first and second pins did not extend in response to the second command to extend the one of the first and second pins.

In further features, the camshaft slider control method further includes: in response to a determination that the one of the first and second pins extended in response to the command to extend the one of the first and second pins, issuing a second command to extend the one of the first and second pins to slide the intake camshaft slider and achieve the last stored indicator of the intake mode command; and indicating that the actual intake mode is the last stored indicator of the intake mode command when the one of the first and second pins did extend in response to the second command to extend the one of the first and second pins.

In further features, the camshaft slider control method further includes determining the one of the first and second pins to extend based on the last stored indicator of the intake mode command.

In a feature, a camshaft slider control method for an engine of a vehicle is described. The camshaft slider control method includes: selectively setting an exhaust mode command to one of: a deactivation mode; a non-deactivation lift mode; based on the exhaust mode command: selectively extending a first pin of a slider actuator into a first groove of a grooved member of an exhaust camshaft slider, wherein contact between the first pin and the first groove during rotation of an exhaust camshaft slides the exhaust camshaft slider in a first direction axially along the exhaust camshaft; and selectively extending a second pin of the slider actuator into a second groove of the grooved member of the exhaust camshaft slider, wherein contact between the second pin and the second groove during rotation of the exhaust camshaft slides the exhaust camshaft slider in a second direction axially along the exhaust camshaft. The camshaft slider control method further includes: determining a last stored indicator of the exhaust mode command; commanding extension of one of the first and second pins to slide the exhaust camshaft slider and achieve the last stored indicator of the exhaust mode command; indicating that an actual exhaust mode is the last stored indicator of the exhaust mode command when the one of the first and second pins did not extend in response to the command to extend the one of the first and second pins; and updating the exhaust mode command to the actual exhaust mode.

In further features, the camshaft slider control method further includes determining whether the one of the first and second pins extended based on signals from at least one sensor associated with the one of the first and second pins.

In further features, the at least one sensor includes at least one of a Hall Effect sensor and a back electromagnetic force (EMF) sensor.

In further features, the camshaft slider control method further includes determining that the one of the first and second pins extended when a change in the signals is greater than a predetermined value.

In further features, the camshaft slider control method further includes indicating that the actual exhaust mode is the one of the deactivation and non-deactivation modes when the one of the first and second pins extended in response to the command to extend the one of the first and second pins.

In further features, the camshaft slider control method further includes determining the one of the first and second pins to extend based on the last stored indicator of the exhaust mode command.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A camshaft of an engine controls opening of valves of an engine. For example, an intake camshaft controls opening of intake valves of cylinders, and an exhaust camshaft controls opening of exhaust valves of cylinders.

A camshaft slider is coupled to and rotates with a camshaft. The camshaft slider slides axially along the camshaft to engage different sets of camshaft lobes with the valves. For example, an intake camshaft slider may slide along an intake camshaft to engage high lift cam lobes, low lift cam lobes, and deactivation cam lobes with intake valves of one or more cylinders. An exhaust camshaft slider may slide along an exhaust camshaft to engage deactivation cam lobes and non-deactivation (e.g., high lift) cam lobes with exhaust valves of one or more cylinders.

An engine control module (ECM) controls actuation of the camshaft sliders of an engine. At engine shutdown, the ECM stores a commanded operating mode of a camshaft slider. The operating mode indicates which set of camshaft lobes are engaged. At engine startup, the ECM determines the stored commanded operating mode of a camshaft slider from a last engine shutdown. An actual operating mode of the camshaft slider, however, could be different than the stored operating mode. The ECM therefore determines and/or verifies the actual operating mode of the camshaft slider at engine startup. While the determination/verification of the actual operating mode is described with respect to the example of engine startup based on the stored mode from the last engine shutdown, the determination/verification can be performed at another time using the last stored mode.

Figure 1:
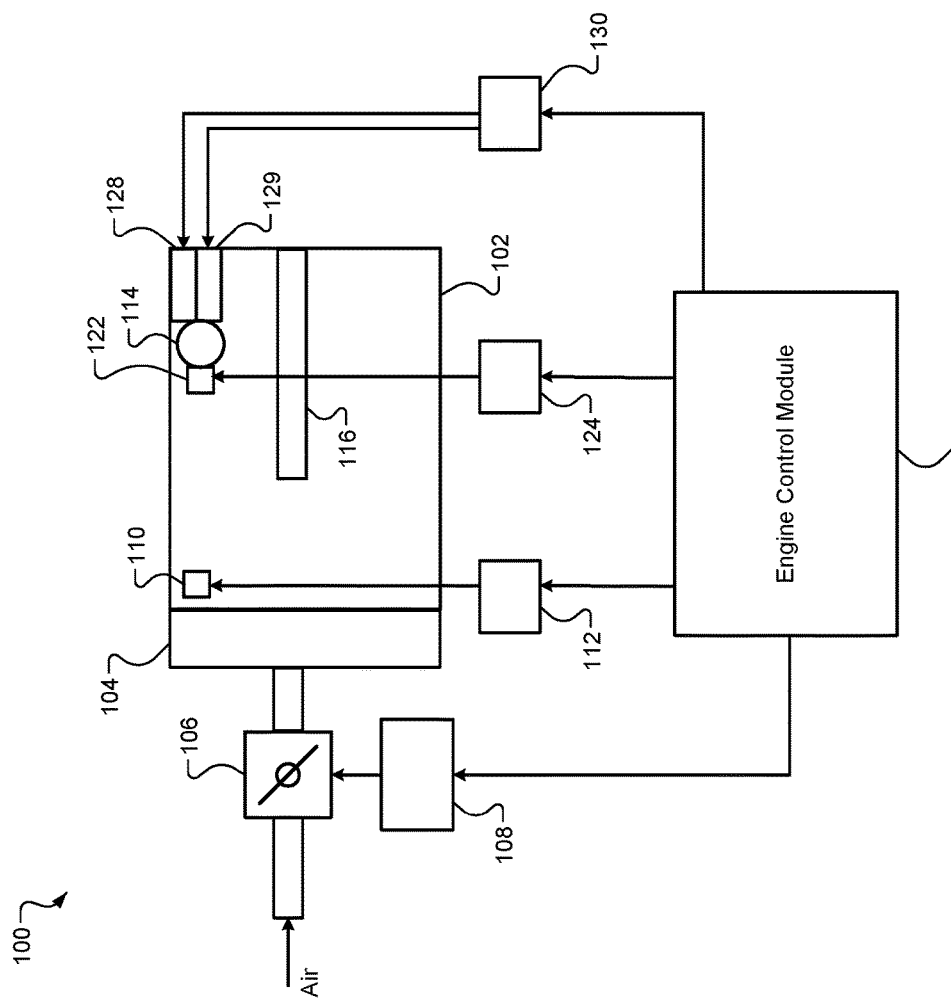
FIG. 1 is a functional block diagram of an example engine control system.

Referring now to FIG. 1, a functional block diagram of an example engine control system 100 is presented. An engine 102 generates drive torque for a vehicle. Air is drawn into the engine 102 through an intake manifold 104. Airflow into the intake manifold 104 may be varied by a throttle valve 106. A throttle actuator module 108 (e.g., an electronic throttle controller) controls opening of the throttle valve 106 based on signals from an engine control module (ECM) 160. One or more fuel injectors, such as fuel injector 110, mix fuel with the air to form a combustible air/fuel mixture. A fuel actuator module 112 controls the fuel injector(s) based on signals from the ECM 160. A cylinder 114 includes a piston (not shown) that is coupled to a crankshaft 116. Although the engine 102 is depicted as including only the cylinder 114 in FIG. 1, the engine 102 includes more than one cylinder (see, e.g., FIG. 2).

Figure 2:
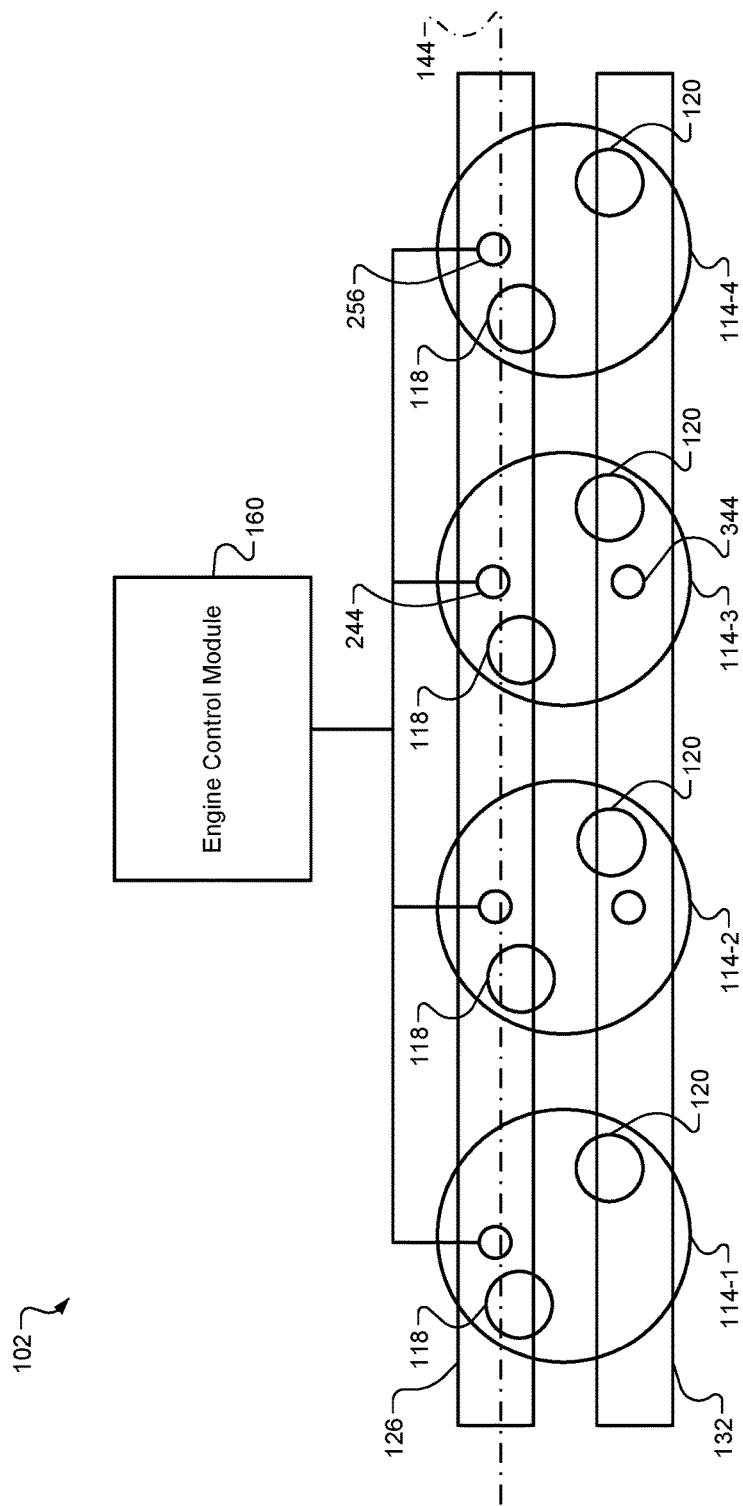
FIG. 2 is a functional block diagram including an example cylinder system of an engine.

FIG. 2 is a diagram of an example cylinder system. The engine 102 includes a plurality of cylinders, such as a first cylinder 114-1, a second cylinder 114-2, a third cylinder 114-3, and a fourth cylinder 114-4. Although FIG. 2 illustrates four cylinders, the engine 102 may include more or fewer cylinders.

One or more intake valves are associated with each cylinder. For example, each cylinder is illustrated as including one intake valve 118. The timing of opening and closing of the intake valves is regulated by an intake camshaft 126. An intake camshaft, such as the intake camshaft 126, may be provided for each bank of cylinders of the engine 102.

One or more exhaust valves are also associated with each cylinder. For example, each cylinder is illustrated as including one exhaust valve 120. The timing of opening and closing of the exhaust valves is regulated by an exhaust camshaft 132. An exhaust camshaft, such as the exhaust camshaft 132, may be provided for each bank of cylinders of the engine 102. Rotation of the intake camshaft(s) 126 and the exhaust camshaft(s) 132 is generally driven by rotation of the crankshaft 116, such as by a belt or a chain.

One or more spark plugs may be associated with each cylinder. FIG. 1 includes a spark plug 122 of one cylinder. Air and fuel within a cylinder may be ignited via spark from a spark plug. A spark actuator module 124 controls the spark plugs based on signals from the ECM 160.

A cam phaser regulates rotation of an associated camshaft. For example, an intake cam phaser 128 regulates rotation of the Intake camshaft 126. An exhaust cam phaser 129 regulates rotation of the exhaust camshaft 132. A phaser actuator module 130 may control the intake cam phaser 128 based on signals from the ECM 160. The phaser actuator module 130 or another phaser actuator module may control the exhaust cam phaser 129 based on signals from the ECM 160.

Figure 3:
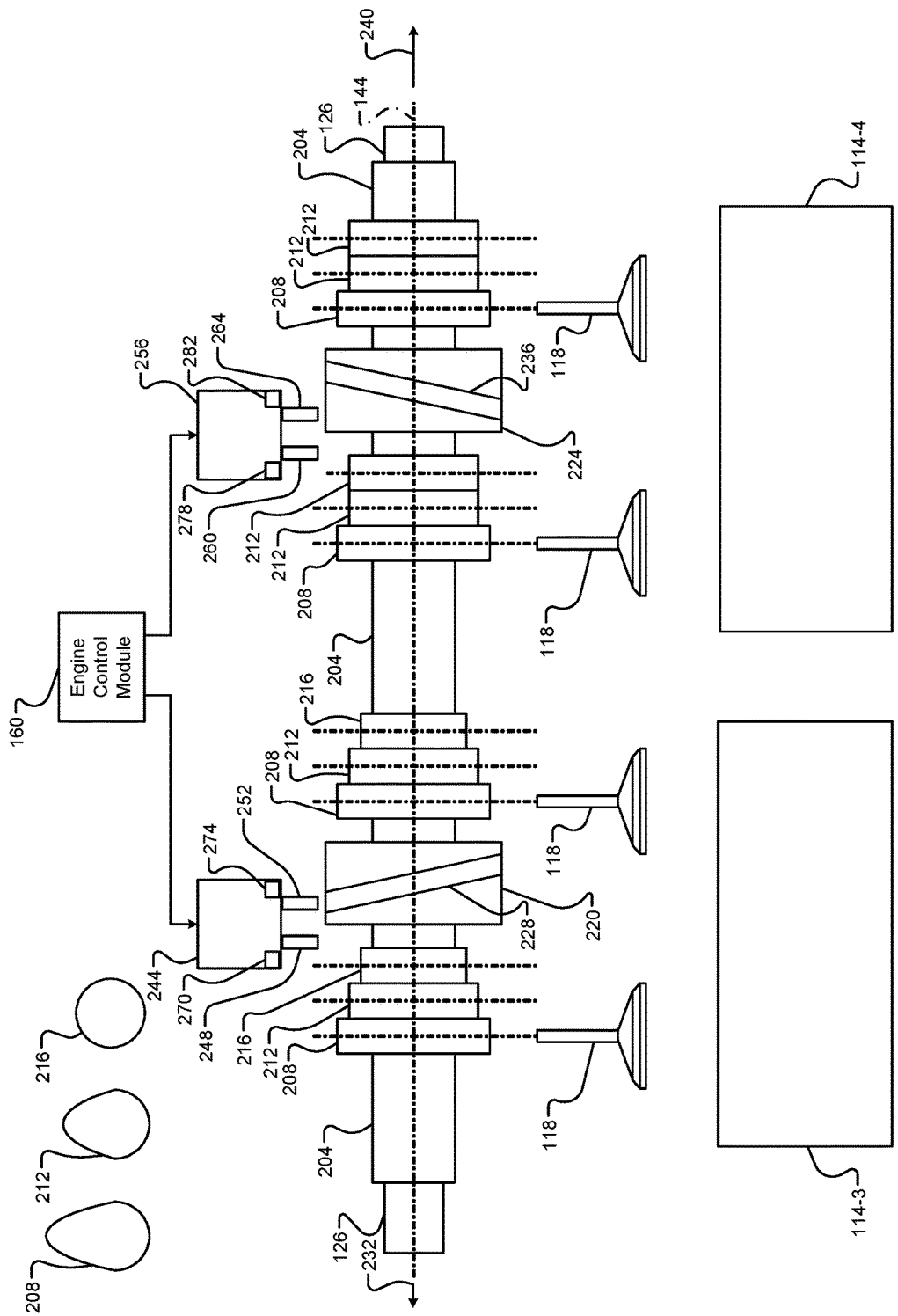
FIG. 3 is a functional block diagram including an example of a portion of a sliding intake camshaft.

FIG. 3 is a functional block diagram including an example sliding portion of the intake camshaft 126. While FIG. 3 is shown and described based on the example of an intake camshaft, FIG. 3 is also applicable to an exhaust camshaft.

Referring to FIGS. 2 and 3, the intake camshaft 126 rotates about a camshaft axis 144. A slider 204 is coupled to and rotates with the intake camshaft 126. Cam lobes for each intake valve of two of the cylinders 114 are coupled to and rotate with the intake camshaft 126. While FIG. 3 will be described based on the example of a camshaft slider for two cylinders, one camshaft slider may be used for each cylinder, or one camshaft slider may be used for more than two cylinders. Also, while FIG. 3 provides the example of two intake valves per cylinder, each cylinder may include one or more than two intake valves.

A set of three cam lobes is coupled to the slider 204 for each intake valve of each cylinder. For example, high lift cam lobes and low lift cam lobes for the intake valves 118 of the third cylinder 114-3 and fourth cylinder 114-4 are coupled to the slider 204. High lift cam lobes are commonly shown by 208, and low lift cam lobes are commonly shown by 212. Deactivation cam lobes are also coupled to the slider 204 for each intake valve 118 of the third cylinder 114-3. Deactivation cam lobes are commonly shown by 216. While FIG. 3 is provided with the example of two low lift cam lobes per intake valve of the fourth cylinder 114-4, the fourth cylinder 114-4 may have a deactivation cam lobe for each intake valve, similar to those shown for the third cylinder 114-3. Different possible combinations of high, low, and deactivation cam lobes can be used for each valve of each cylinder. As another example, one valve of a cylinder can have high, low, and deactivation cam lobes while another valve of the cylinder can have high, low, and low lift cam lobes. The other valve having high, high, and low lift cam lobes, or high, low, and high lift cam lobes are other example possibilities, although there are even more possible examples.

The intake valves 118 are biased toward the intake camshaft 126 via springs (not shown). Profiles of the high and low lift cam lobes 208 and 212 cause opening of the associated intake valves 118. The profile of the high lift cam lobes 208 causes the associated intake valves 118 to open further (i.e., more lift) and for a longer period (i.e., longer duration) than the profile of the low lift cam lobes 212. The deactivation cam lobe 216 profile may be circular (e.g., zero lift) in order to deactivate the opening and closing of intake valves 118. Example profiles for high, low, and deactivation cam lobes are also provided in FIG. 3.

A first grooved member 220 and second grooved member 224, are also coupled to and rotate with the slider 204 in the example of FIG. 3. The first grooved member 220 includes a groove 228 for sliding the slider 204 (including the cam lobes and the first and second grooved members 220 and 224) in a first axial direction 232. The second grooved member 224 includes a groove 236 for sliding the slider 204 (including the cam lobes and the first and second grooved members 220 and 224) in a second axial direction 240 that is opposite the first axial direction 232.

A first slider actuator 244 includes a first pin 248 and a second pin 252. The first and second pins 248 and 252 may be extended and retracted electrically. When the slider 204 is positioned for lifting of the intake valves 118 using the high lift cam lobes 208, the second pin 252 can be extended into the groove 228 to slide the slider 204 a first distance in the first axial direction 232 to engage the low lift cam lobes 212 with the intake valves 118. In the case of the fourth cylinder 114-4, specifically the middle set of low lift cam lobes 212 would be engaged with the intake valves 118.

When the slider 204 is positioned for lifting of the intake valves 118 using the low lift cam lobes 212, the first pin 248 can be extended into the groove 228 to slide the slider 204 a second distance in the first axial direction 232 to engage the deactivation cam lobes 216 with the intake valves 118 of the third cylinder 114-3 and the (right most) low lift cam lobes 212 with the intake valves 118 of the fourth cylinder 114-4.

A second slider actuator 256 includes a third pin 260 and a fourth pin 264. The third and fourth pins 260 and 264 may be extended and retracted electrically. When the slider 204 is positioned for lifting of the intake valves 118 of the third cylinder 114-3 with the deactivation cam lobes 216 and the intake valves 118 of the second cylinder 114-1 with the (right most) low lift cam lobes 212, the third pin 260 can be extended into the groove 236 to slide the slider 204 the second distance in the second axial direction 240 to engage the low lift cam lobes 212 with the intake valves 118. In the case of the fourth cylinder 114-4, specifically the middle set of low lift cam lobes 212 would be engaged with the intake valves 118. When the slider 204 is positioned for lifting of the intake valves 118 using the low lift cam lobes 212, the fourth pin 264 can be extended into the groove 236 to slide the slider 204 the first distance in the second axial direction 240 to engage the high lift cam lobes 208 with the intake valves 118.

Timing of the extension of the pins 248, 252, 260, and 264 is generally controlled such that the pins enter the respective grooves to slide the slider 204. Sliding is generally performed at times when the cam lobes are not presently lifting the associated intake valves 118. While not specifically shown in FIG. 2, a second slider, cam lobes, grooved members, and slider actuators may be provided for the first and second cylinders 114-1 and 114-2. The ECM 160 controls the slider actuators 244 and 256, as discussed further below.

One or more sensors may be implemented with each pin. For example, a Hall Effect sensor and/or a back electromotive force (EMF) sensor, commonly illustrated by 270, may be implemented with the first pin 248. A Hall Effect sensor and/or a back EMF sensor, commonly illustrated by 274, may be implemented with the second pin 252. A Hall Effect sensor and/or a back EMF sensor, commonly illustrated by 278, may be implemented with the third pin 260. A Hall Effect sensor and/or a back EMF sensor, commonly illustrated by 282, may be implemented with the fourth pin 264. In various implementations, one sensor may be provided for two pins. The ECM 160 may determine a position of a pin or whether the pin moved based on feedback signals from the sensor(s) associated with that pin.

Figure 4:
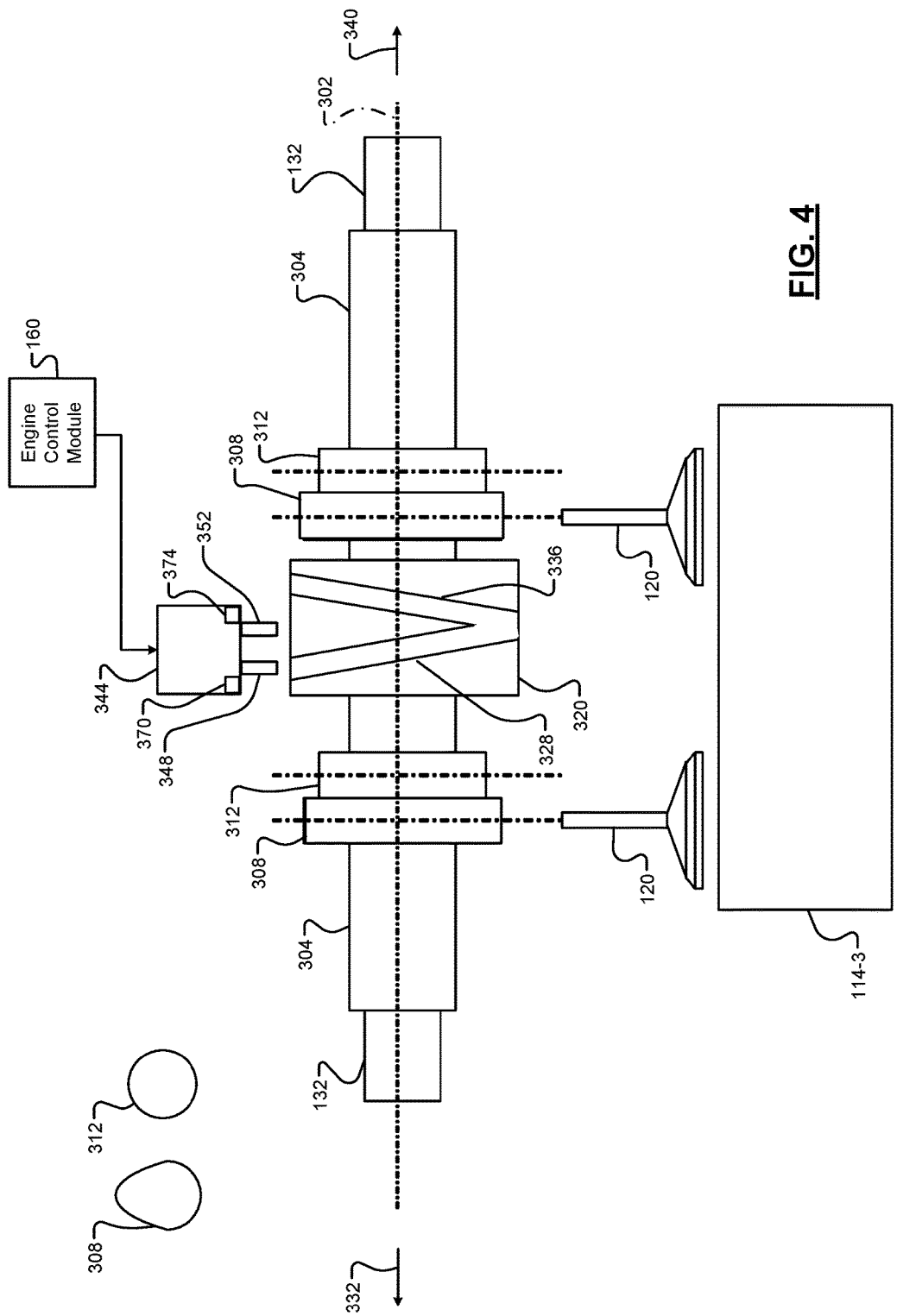
FIG. 4 is a functional block diagram including an example of a portion of a sliding exhaust camshaft.

FIG. 4 is a functional block diagram including an example sliding portion of the exhaust camshaft 132. While FIG. 4 is shown and described based on the example of an exhaust camshaft, FIG. 4 is also applicable to an intake camshaft.

Referring to FIGS. 2 and 4, the exhaust camshaft 132 rotates about a camshaft axis 302. A slider 304 is coupled to and rotates with the exhaust camshaft 132. Cam lobes for each exhaust valve of at least one of the cylinders, such as the third cylinder 114-3, are coupled to and rotate with the exhaust camshaft 132. While FIG. 4 will be described based on the example of a camshaft slider for one cylinders, one camshaft slider may be used for more than two cylinders. Also, while FIG. 4 provides the example of two exhaust valves per cylinder, each cylinder may include one or more than two exhaust valves.

A set of two cam lobes is coupled to the slider 304 for each of the exhaust valves 120 of the cylinder. For example, non-deactivation (e.g., high lift) cam lobes and deactivation cam lobes for the exhaust valves 120 of the third cylinder 114-3 are coupled to the slider 304. Non-deactivation lobes are commonly shown by 308, and deactivation cam lobes are commonly shown by 312.

The exhaust valves are biased toward the exhaust camshaft 132 via springs (not shown). The profile of the non-deactivation cam lobes 308 cause opening of the associated exhaust valves 120. The deactivation cam lobes 312 profile may be circular (e.g., zero lift) in order to deactivate the opening and closing of exhaust valves 120. Example profiles for first and deactivation cam lobes are also provided in FIG. 4. A valve (intake or exhaust valve) remains closed throughout an entire revolution of the associated camshaft when engaged with a deactivation cam lobe.

A grooved member 320 is also coupled to and rotates with the slider 304 in the example of FIG. 4. The grooved member 320 includes a first groove 328 for sliding the slider 304 (including the cam lobes and the grooved member 320) in a first axial direction 332. The grooved member 320 also includes a second groove 336 for sliding the slider 304 (including the cam lobes and the grooved member 320) in a second axial direction 340 that is opposite the first axial direction 332.

A slider actuator 344 includes a fifth pin 348 and a sixth pin 352. The fifth and sixth pins 348 and 352 may be extended and retracted, for example, via electromechanical solenoids. When the slider 304 is positioned for lifting of the exhaust valves 120 using the non-deactivation cam lobes 308, the first pin 348 can be extended into the first groove 328 to slide the slider 304 a distance in the first axial direction 332 to engage the deactivation cam lobes 312 with the exhaust valves 120. When the slider 304 is positioned for using the deactivation cam lobes 312, the second pin 352 can be extended into the second groove 336 to slide the slider 304 the distance in the second axial direction 340 to engage the non-deactivation cam lobes 308 with the exhaust valves 120 of the third cylinder 114-3.

Timing of the extension of the pins 348 and 352 is generally controlled such that the pins enter the respective grooves to slide the slider 304. Sliding is generally performed at times when the cam lobes are not (and would not be) presently lifting the associated exhaust valves 120. While not specifically shown in FIG. 2, a second slider, cam lobes, grooved member, and slider actuator may be provided for the second cylinders 114-2. The ECM 160 controls the slider actuator 344, as discussed further below.

One or more sensors may be implemented with each pin. For example, a Hall Effect sensor and/or a back EMF sensor, commonly illustrated by 370, may be implemented with the fifth pin 348. A Hall Effect sensor and/or a back EMF sensor, commonly illustrated by 374, may be implemented with the sixth pin 352. The ECM 160 may determine a position of a pin or whether the pin moved based on feedback signals from the sensor(s) associated with that pin.

Figure 5:
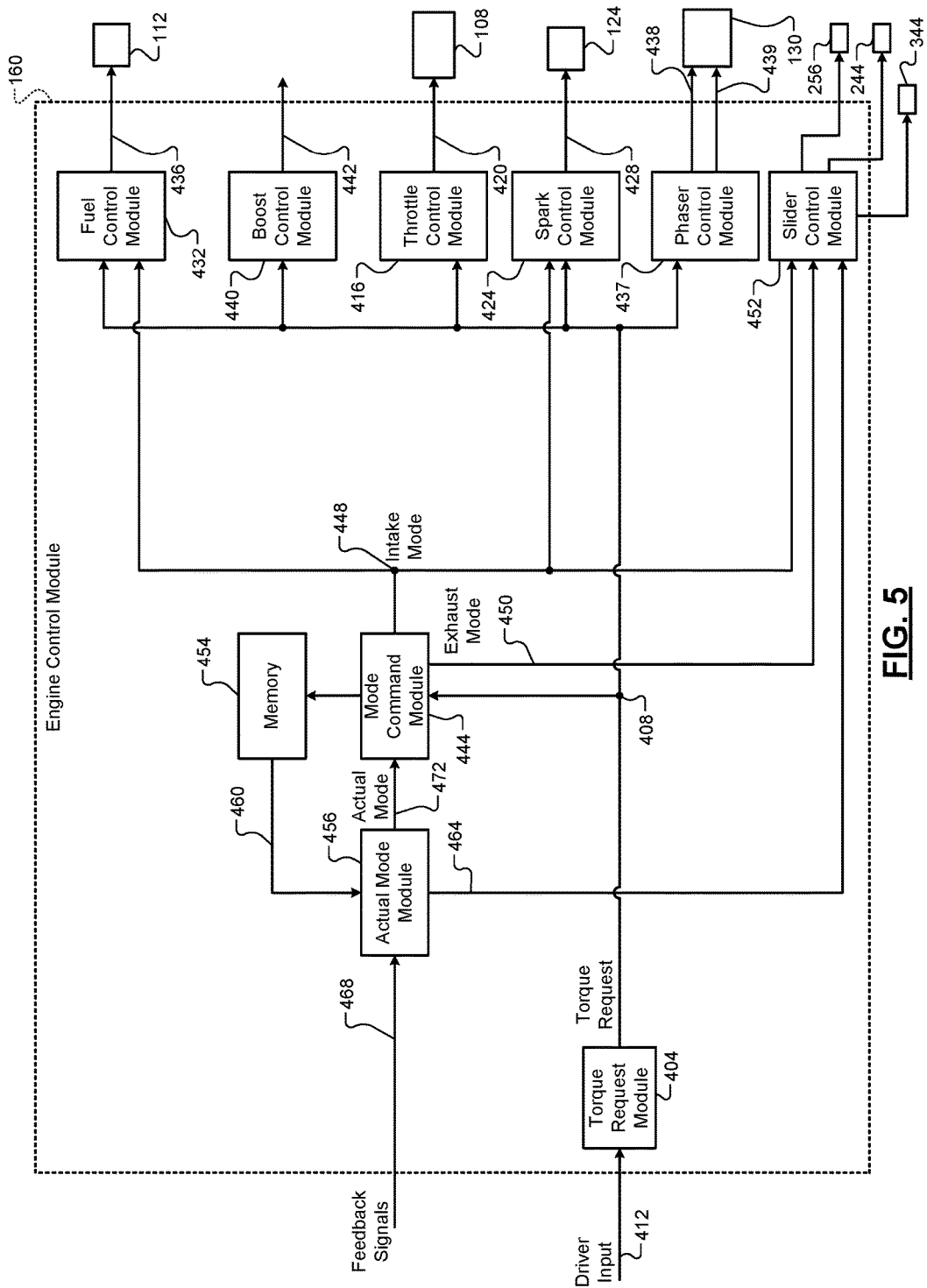
FIG. 5 is a functional block diagram including an engine control module.

FIG. 5 is a functional block diagram of an example implementation of the ECM 160. A torque request module 404 determines a torque request 408 for the engine 102 based on one or more driver inputs 412 and a vehicle speed. The driver inputs 412 may include, for example, an accelerator pedal position, a brake pedal position, a cruise control input, and/or one or more other suitable driver inputs. The torque request module 404 may determine the torque request 408 additionally or alternatively based on one or more other torque requests, such as torque requests generated by the ECM 160 and/or torque requests received from other modules of the vehicle, such as a transmission control module, a hybrid control module, a chassis control module, etc.

One or more engine actuators are controlled based on the torque request 408 and/or one or more other parameters. For example, a throttle control module 416 may determine a target throttle opening 420 based on the torque request 408. The throttle actuator module 108 may adjust opening of the throttle valve 106 based on the target throttle opening 420.

Generally speaking, a spark control module 424 determines a target spark timing 428 based on the torque request 408. The spark control module 424 generates spark based on the target spark timing 428. A fuel control module 432 determines one or more target fueling parameters 436 based on the torque request 408. For example, the target fueling parameters 436 may include fuel injection amount, number of fuel injections for injecting the amount, and injection timing. The fuel actuator module 112 controls fuel injection based on the target fueling parameters 436.

A phaser control module 437 determines target intake and exhaust cam phaser angles 438 and 439 based on the torque request 408. The phaser actuator module 130 may regulate intake and exhaust cam phasers (not shown) based on the target intake and exhaust cam phaser angles 438 and 439, respectively. A boost control module 440 may determine one or more targets, such as target output 442, based on the torque request 408. A boost actuator module may control output of a boost device (e.g., a turbocharger or a supercharger) based on the target output 442.

A mode command module 444 generates an intake mode command 448 and an exhaust mode command 450. At a given time, the mode command module 444 may set the intake mode command 448 to one of: a low lift mode; a high lift mode; and a deactivation mode.

During normal engine operation, the mode command module 444 may set the intake mode command 448 based on one or more current engine operating parameters, such as the torque request 408, the (present) mode command 448, and/or one or more other engine operating parameters. For example, when the intake mode command 448 is in the low lift mode, the mode command module 444 may transition the intake mode command 448 to the high lift mode when the torque request 408 increases. When the intake mode command 448 is in the low lift mode, the mode command module 444 may transition the intake mode command 448 to the deactivation mode when the torque request 408 decreases. When the intake mode command 448 is in the deactivation mode, the mode command module 444 may transition the intake mode command 448 to the low lift mode when the torque request 408 increases. When the intake mode command 448 is in the high lift mode, the mode command module 444 may transition the intake mode command 448 to the low lift mode when the torque request 408 decreases.

The mode command module 444 may set the exhaust mode command 450 to one of: a non-deactivation mode; and a deactivation mode. The mode command module 444 may set the exhaust mode command 450 in concert with the setting of the intake mode command 448. For example, the mode command module 444 may transition the exhaust mode command 450 from the deactivation mode to the non-deactivation mode when transitioning the intake mode command 448 from the deactivation mode to the low lift mode. The mode command module 444 may transition the exhaust mode command 450 from the non-deactivation mode to the deactivation mode when transitioning the intake mode command 448 from the low lift mode to the deactivation mode.

A slider control module 452 controls extension/retraction of pins of the slider actuators to control sliding of the sliders based on the intake mode command 448 and exhaust mode command 450. For example, when the intake mode command 448 transitions from the deactivation mode to the low lift mode, the slider control module 452 may apply power to the second slider actuator 256 at a time to extend the third pin 260 into the groove 236 of the second grooved member 224 to transition from use of the deactivation cam lobes 216 to the use of the low lift cam lobes 212. When the exhaust mode command 450 transitions from the deactivation mode to the non-deactivation mode, the slider control module 452 may apply power to the slider actuator 344 at a time to extend the sixth pin 352 into the second groove 336 of the grooved member 320 to transition from use of the deactivation cam lobes 312 to the use of the non-deactivation cam lobes 308.

When the intake mode command 448 transitions from the low lift mode to the deactivation mode, the slider control module 452 may apply power to the first slider actuator 244 at a time to extend the first pin 248 into the groove 228 of the first grooved member 220 to transition from use of the low lift cam lobes 212 to the use of the deactivation cam lobes 216. When the exhaust mode command 450 transitions from the non-deactivation mode to the deactivation mode, the slider control module 452 may apply power to the slider actuator 344 at a time to extend the fifth pin 348 into the first groove 328 of the grooved member 320 to transition from use of the non-deactivation cam lobes 308 to the use of the deactivation cam lobes 312.

When the intake mode command 448 transitions from the low lift mode to the high lift mode, the slider control module 452 may apply power to the second slider actuator 256 at a time to extend the fourth pin 264 into the groove 236 of the second grooved member 224 to transition from use of the low lift cam lobes 212 to the use of the high lift cam lobes 208. When the intake mode command 448 transitions from the high lift mode to the low lift mode, the slider control module 452 may apply power to the first slider actuator 244 at a time to extend the second pin 252 into the groove 228 of the first grooved member 220 to transition from use of the high lift lobes 208 to the use of the low lift cam lobes 212.

The mode command module 444 does not transition the intake mode command 448 from the high lift mode directly to the deactivation mode or from the deactivation mode directly to the high lift mode. Instead, the mode command module 444 first transitions the intake mode command 448 to the low lift mode. The mode command module 444 stores the intake mode command 448 and the exhaust mode command 450 in memory 454 when engine shutdown is performed. A driver may command engine shutdown, for example, via one or more ignition buttons, keys, and/or switches.

The commanded modes stored for an engine shutdown maybe used at a next engine startup following the engine shutdown to determine how the commanded intake and exhaust modes 448 and 450 can be transitioned. A driver may command engine startup, for example, via one or more ignition buttons, keys, and/or switches. The actual mode of a camshaft slider at engine startup, however, may be different than the commanded mode stored from the last engine shutdown under some circumstances. A difference between the actual and commanded modes may result in abnormal engine operation and/or one or more failures.

At engine startup, an actual mode module 456 retrieves the stored commanded (intake and exhaust) modes 460 from the memory 454 from the last engine shutdown. As stated above, while the determination/verification of the actual operating mode is described with respect to the example of engine startup based on the stored mode from the last engine shutdown, the determination/verification can be performed at another time using the last stored mode. A driver may command engine startup, for example, via one or more ignition buttons, keys, and/or switches. The actual mode module 456 generates test commands 464 for the slider control module 452 in order to determine an actual mode 472 of a camshaft slider at engine startup. The slider control module 452 controls the pins of the slider actuators based on the test commands 464. Once determined, the mode command module 444 updates the commanded (intake or exhaust) mode to the actual mode 472 for that camshaft slider. The mode command module 444 may then transition the commanded mode, as discussed above. As discussed further below, the actual mode module 456 generates the test commands 464 and determines the actual mode of a camshaft slider based on feedback signals 468 from the sensors (e.g., sensors 270, 274, 278, 282, 370, and 374) of the pins of the slider actuator(s) associated with that camshaft slider.

Figure 6A:
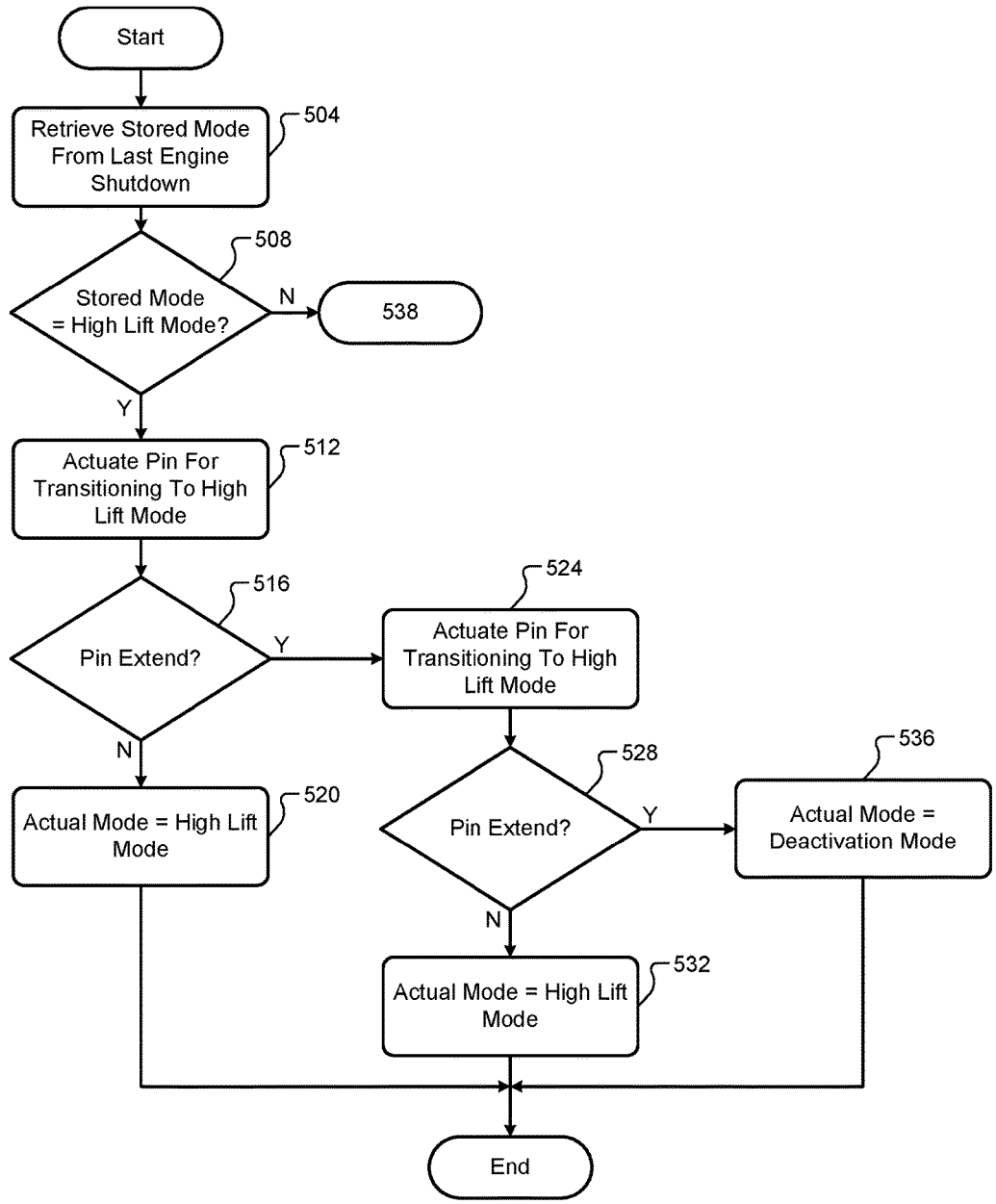
FIGS. 6A-6B include a flowchart depicting an example method of determining and verifying a mode of a camshaft slider.
Figure 6B:
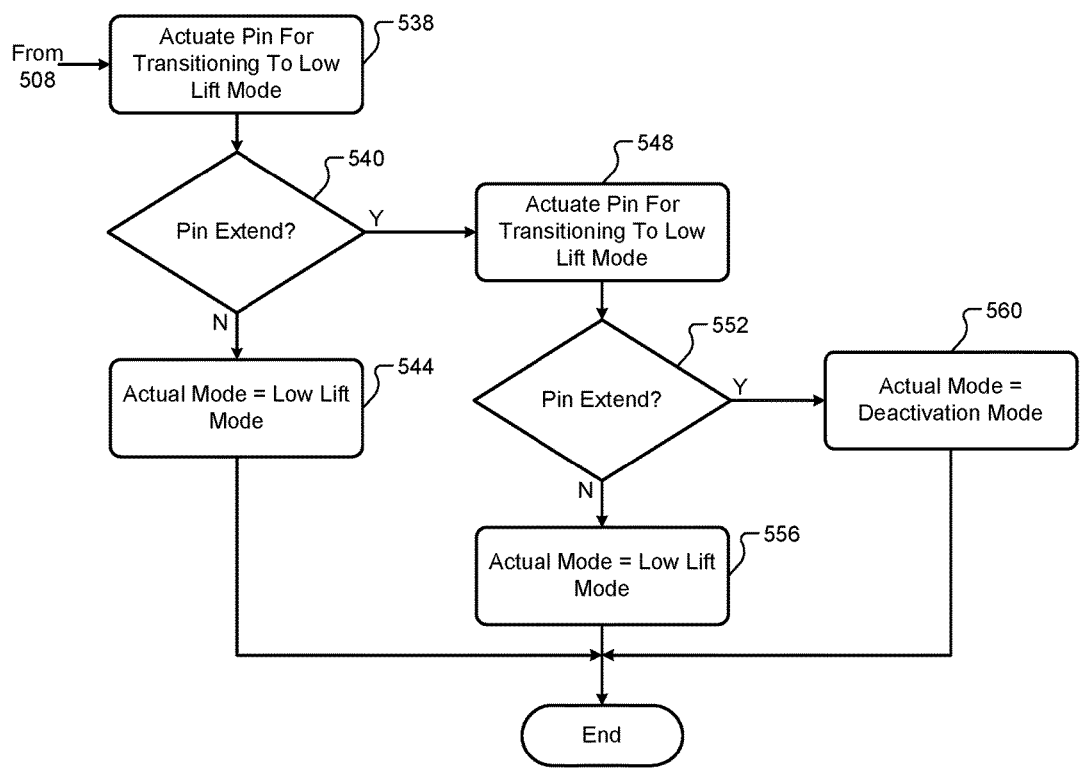

FIGS. 6A and 6B include a flowchart depicting an example method of determining and verifying the actual mode of the slider 204. Control begins with 504. For example, control may begin with 504 after engine startup, such as once the engine speed is greater than a predetermined engine speed after engine startup. While the example of after engine startup has been provided, the determination and verification of the actual mode may be performed at another suitable time.

At 504, the actual mode module 456 retrieves the stored mode 460 from the memory 454. The stored mode 460 indicates the last stored intake mode command 448. At 508, the actual mode module 456 determines whether the stored mode 460 was the high lift mode. If 508 is true, control continues with 512. If 508 is false (i.e., the stored mode 460 was one of: the low lift mode; and the deactivation mode), control continues with 538 (FIG. 6B), which is discussed further below.

At 512, the actual mode module 456 commands the slider control module 452 to extend the fourth pin 264 of the second slider actuator 256 into the groove 236 to transition from the low lift mode to the high lift mode. In response to the command, the slider control module 452 applies current to extend the fourth pin 264 at a (rotational) time when the fourth pin 264 would extend into the groove 236 and cause a transition to the high lift mode if low lift mode was actually in use (as opposed to high lift mode as indicated by the stored mode 460).

The actual mode module 456 determines whether the fourth pin 264 extended at 516 based on the feedback signals from the sensors 282. For example, the actual mode module 456 may determine that the fourth pin 264 extended when the feedback signals from the sensors 282 change by at least a predetermined amount. If 516 is false (i.e., the fourth pin 264 did not extend), the actual mode module 456 indicates that the actual mode 472 is the high lift mode at 520. In this case, the fourth pin 264 did not extend due to contacting (the non-grooved portion of) the second grooved member 224. The mode command module 444 sets the intake mode command 448 to the actual mode 472 at 520. The mode command module 444 may later transition the intake mode command 448 as it determines. If 516 is false (i.e., the fourth pin 264 did extend), control continues with 524. In this case, either: (1) the fourth pin 264 extended into the groove 236 and caused a transition to the high lift mode; or (2) deactivation mode was in use.

At 524, for a second time, the actual mode module 456 commands the slider control module 452 to extend the fourth pin 264 of the second slider actuator 256 into the groove 236 to transition from the low lift mode to the high lift mode. In response to the command, the slider control module 452 applies current to extend the fourth pin 264 at a (rotational) time when the fourth pin 264 would extend into the groove 236 and cause a transition to the high lift mode if low lift mode was actually in use.

At 528, the actual mode module 456 again determines whether the fourth pin 264 extended based on the feedback signals from the sensors 282. For example, the actual mode module 456 may determine that the fourth pin 264 extended when the feedback signals from the sensors 282 change by at least the predetermined amount. In this case, the fourth pin 264 would extend due to deactivation mode being in use. The fourth pin 264 would not extend due to contacting (the non-grooved portion of) the second grooved member 224. If 528 is false (i.e., the fourth pin 264 did not extend), the actual mode module 456 indicates that the actual mode 472 is the high lift mode at 520. If 528 is true (i.e., the fourth pin 264 did extend), the actual mode module 456 indicates that the actual mode 472 is the deactivation mode at 536. The mode command module 444 sets the intake mode command 448 to the actual mode 472 at 532 or 536. The mode command module 444 may later transition the intake mode command 448 as it determines.

As discussed above, if 508 (FIG. 6A) is false (i.e., the stored mode 460 was one of: the low lift mode; and the deactivation mode), control continues with 538 (FIG. 6B). At 538, the actual mode module 456 commands the slider control module 452 to extend the second pin 252 of the first slider actuator 244 into the groove 228 to transition from the high lift mode to the low lift mode. In response to the command, the slider control module 452 applies current to extend the second pin 252 at a (rotational) time when the second pin 252 would extend into the groove 228 and cause a transition to the low lift mode if high lift mode was actually in use.

The actual mode module 456 determines whether the second pin 252 extended at 540 based on the feedback signals from the sensors 274. For example, the actual mode module 456 may determine that the second pin 252 extended when the feedback signals from the sensors 274 change by at least a predetermined amount. If 540 is false (i.e., the second pin 252 did not extend), the actual mode module 456 indicates that the actual mode 472 is the low lift mode at 520. In this case, the second pin 252 did not extend due to contacting (the non-grooved portion of) the first grooved member 220. The mode command module 444 sets the intake mode command 448 to the actual mode 472 at 544. The mode command module 444 may later transition the intake mode command 448 as it determines. If 540 is false (i.e., the second pin 252 did extend), control continues with 548. In this case, either: (1) the second pin 252 extended into the groove 228 and caused a transition from the high lift mode to the low lift mode; or (2) deactivation mode was in use.

At 552, for a second time, the actual mode module 456 commands the slider control module 452 to extend the second pin 252 of the first slider actuator 244 into the groove 228 to transition from the high lift mode to the low lift mode. In response to the command, the slider control module 452 applies current to extend the second pin 252 at a (rotational) time when the second pin 252 would extend into the groove 228 and cause a transition to the low lift mode if high lift mode was actually in use.

At 552, the actual mode module 456 again determines whether the second pin 252 extended based on the feedback signals from the sensors 274. For example, the actual mode module 456 may determine that the second pin 252 extended when the feedback signals from the sensors 274 change by at least the predetermined amount. In this case, the second pin 252 would extend due to deactivation mode being in use. The second pin 252 would not extend due to contacting (the non-grooved portion of) the first grooved member 220. If 552 is false (i.e., the second pin 252 did not extend), the actual mode module 456 indicates that the actual mode 472 is the low lift mode at 556. If 552 is true (i.e., the second pin 252 did extend), the actual mode module 456 indicates that the actual mode 472 is the deactivation mode at 560. The mode command module 444 sets the intake mode command 448 to the actual mode 472 at 556 or 560. The mode command module 444 may later transition the intake mode command 448 as it determines.

While FIGS. 6A and 6B have been discussed in terms of the slider 204, FIGS. 6A and 6B may be performed for each other intake slider actuator of the engine 102. Also, while the slider 204 is illustrated and described as being used in conjunction with the intake camshaft 126, the slider 204 could also be used in conjunction with an exhaust camshaft. As used herein, a pin not extending refers to a pin not fully extending as it would if it extended into a groove. A pin that only partially extends, such as due to clearance between the pins (when retracted) and a grooved member, will be considered to have not extended.

Figure 7:
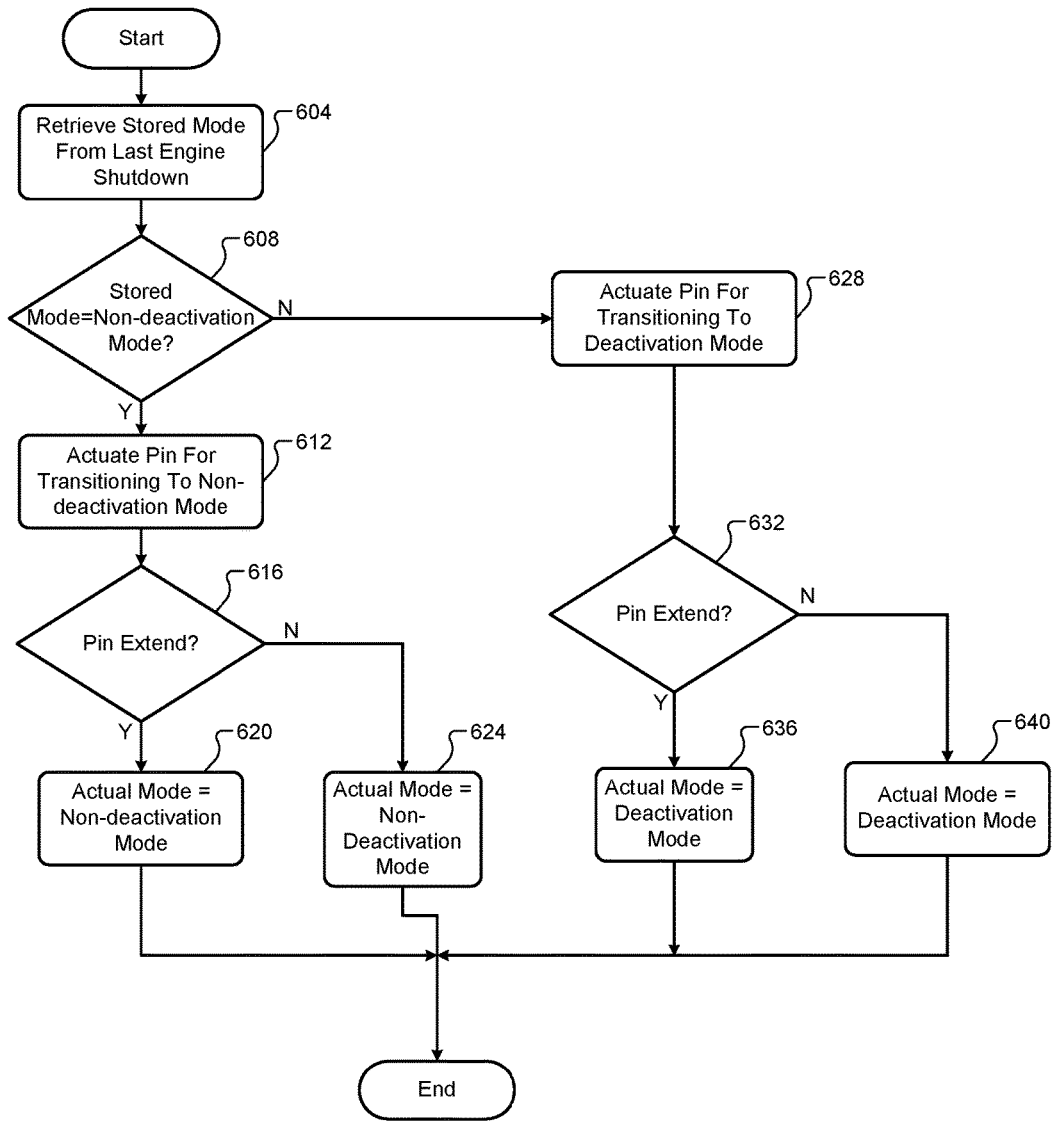
FIG. 7 includes a flowchart depicting an example method of determining and verifying a mode of a camshaft slider.

FIG. 7 includes a flowchart depicting an example method of determining and verifying the actual mode of the slider 304. Control begins with 604. For example, control may begin with 604 after engine startup, such as once the engine speed is greater than a predetermined engine speed after engine startup. While the example of after engine startup has been provided, the determination and verification of the actual mode may be performed at another suitable time.

At 604, the actual mode module 456 retrieves the stored mode 460 of the slider 304 from the memory 454. The stored mode 460 indicates the last stored exhaust mode command 450. Since the slider 304 has two sets of camshaft lobes for each exhaust valve, the mode may be either: deactivation mode; or non-deactivation mode. Non-deactivation mode corresponds to operation using the non-deactivation cam lobes 308, while deactivation mode corresponds to operation using the deactivation cam lobes 312.

At 608, the actual mode module 456 determines whether the stored mode 460 was the non-deactivation mode. If 608 is true, control continues with 612. If 608 is false (i.e., the stored mode 460 was the deactivation mode), control continues with 628, which is discussed further below.

At 612, the actual mode module 456 commands the slider control module 452 to extend the sixth pin 352 of the slider actuator 344 into the second groove 336 to transition from the deactivation mode to the non-deactivation mode. In response to the command, the slider control module 452 applies current to extend the sixth pin 352 at a (rotational) time when the sixth pin 352 would extend into the second groove 336 and cause a transition to the non-deactivation mode if the deactivation mode was actually in use (as opposed to non-deactivation mode as indicated by the stored mode 460).

The actual mode module 456 determines whether the sixth pin 352 extended at 616 based on the feedback signals from the sensors 374. For example, the actual mode module 456 may determine that the sixth pin 352 extended when the feedback signals from the sensors 374 change by at least a predetermined amount. If 616 is true (i.e., the sixth pin 352 did extend), the actual mode module 456 indicates that the actual mode 472 is the non-deactivation mode at 620. In this case, the sixth pin 352 extended and caused a transition to the non-deactivation mode. If 616 is false (i.e., the sixth pin 352 did not extend), the actual mode module 456 indicates that the actual mode 472 is the non-deactivation mode at 624. In this case, the sixth pin 352 did not extend due to contacting (the non-grooved portion of) the grooved member 320.

As discussed above, if 608 is false (i.e., the stored mode 460 was the deactivation mode), control continues with 628.

At 628, the actual mode module 456 commands the slider control module 452 to extend the fifth pin 348 of the slider actuator 344 into the first groove 328 to transition from the from the non-deactivation mode to the deactivation mode. In response to the command, the slider control module 452 applies current to extend the fifth pin 348 at a (rotational) time when the fifth pin 348 would extend into the first groove 328 and cause a transition to the deactivation mode if the non-deactivation mode was actually in use.

The actual mode module 456 determines whether the fifth pin 348 extended at 632 based on the feedback signals from the sensors 370. For example, the actual mode module 456 may determine that the fifth pin 348 extended when the feedback signals from the sensors 370 change by at least a predetermined amount. If 632 is true (i.e., the fifth pin 348 did extend), the actual mode module 456 indicates that the actual mode 472 is the deactivation mode at 536. In this case, the fifth pin 348 extended into the first groove 328 and caused a transition to the deactivation mode. If 632 is false (i.e., the fifth pin 348 did not extend), the actual mode module 456 indicates that the actual mode 472 is the deactivation mode at 640.

The mode command module 444 sets the exhaust mode command 450 for the slider 304 to the actual mode 472 at 620, 624, 636, or 640. The mode command module 444 may later transition the exhaust mode command 450 to the other one of the two modes as it determines.

While FIG. 7 has been discussed in terms of the slider 304, FIG. 7 may be performed for each other exhaust slider actuator of the engine 102. Also, while the slider 304 is illustrated and described as being used in conjunction with the exhaust camshaft 132, the slider 304 could also be used in conjunction with an intake camshaft.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A camshaft slider control system of an engine of a vehicle, comprising:
a mode command module that selectively sets an intake mode command to one of: a deactivation mode; a low lift mode; and a high lift mode;
a slider control module that, based on the intake mode command:
selectively extends a first pin of a first slider actuator into a first groove of a first grooved member of an intake camshaft slider, wherein contact between the first pin and the first groove during rotation of an intake camshaft slides the intake camshaft slider in a first direction axially along the intake camshaft; and
selectively extends a second pin of a second slider actuator into a second groove of a second grooved member of the intake camshaft slider, wherein contact between the second pin and the second groove during rotation of the intake camshaft slides the intake camshaft slider in a second direction axially along the intake camshaft; and
an actual mode module that:
determines a last stored indicator of the intake mode command;
commands the slider control module to extend one of the first and second pins to slide the intake camshaft slider and achieve the last stored indicator of the intake mode command; and
based on whether the one of the first and second pins extended in response to the command, indicates that an actual intake mode is either: (i) the last stored indicator of the intake mode command; or (ii) another one of the deactivation, low lift, and high lift modes,
wherein the mode command module updates the intake mode command to the actual intake mode.

2. The camshaft slider control system of claim 1 wherein the actual mode module determines whether the one of the first and second pins extended based on signals from at least one sensor associated with the one of the first and second pins.

3. The camshaft slider control system of claim 2 wherein the at least one sensor includes at least one of a Hall Effect sensor and a back electromagnetic force (EMF) sensor.

4. The camshaft slider control system of claim 3 wherein the actual mode module determines that the one of the first and second pins extended when a change in the signals is greater than a predetermined value.

5. The camshaft slider control system of claim 1 wherein the actual mode module further:
in response to a determination that the one of the first and second pins extended in response to the command to extend the one of the first and second pins, issues a second command the slider control module to extend the one of the first and second pins to slide the intake camshaft slider and achieve the last stored indicator of the intake mode command; and
indicates that the actual intake mode is the last stored indicator of the intake mode command when the one of the first and second pins did not extend in response to the second command to extend the one of the first and second pins.

6. The camshaft slider control system of claim 1 wherein the actual mode module further:
in response to a determination that the one of the first and second pins extended in response to the command to extend the one of the first and second pins, issues a second command the slider control module to extend the one of the first and second pins to slide the intake camshaft slider and achieve the last stored indicator of the intake mode command; and
indicates that the actual intake mode is the last stored indicator of the intake mode command when the one of the first and second pins did extend in response to the second command to extend the one of the first and second pins.

7. The camshaft slider control system of claim 1 wherein the actual mode module determines the one of the first and second pins to extend based on the last stored indicator of the intake mode command.

8. A camshaft slider control system of an engine of a vehicle, comprising:
a mode command module that selectively sets an exhaust mode command to one of: a deactivation mode; a non-deactivation lift mode;
a slider control module that, based on the exhaust mode command:
selectively extends a first pin of a slider actuator into a first groove of a grooved member of an exhaust camshaft slider, wherein contact between the first pin and the first groove during rotation of an exhaust camshaft slides the exhaust camshaft slider in a first direction axially along the exhaust camshaft; and
selectively extends a second pin of the slider actuator into a second groove of the grooved member of the exhaust camshaft slider, wherein contact between the second pin and the second groove during rotation of the exhaust camshaft slides the exhaust camshaft slider in a second direction axially along the exhaust camshaft; and
an actual mode module that:
determines a last stored indicator of the exhaust mode command;

commands the slider control module to extend one of the first and second pins to slide the exhaust camshaft slider and achieve the last stored indicator of the exhaust mode command; and
indicates that an actual exhaust mode is the last stored indicator of the exhaust mode command when the one of the first and second pins did not extend in response to the command to extend the one of the first and second pins,
wherein the mode command module updates the exhaust mode command to the actual exhaust mode.

9. The camshaft slider control system of claim 8 wherein the actual mode module determines whether the one of the first and second pins extended based on signals from at least one sensor associated with the one of the first and second pins.

10. The camshaft slider control system of claim 9 wherein the at least one sensor includes at least one of a Hall Effect sensor and a back electromagnetic force (EMF) sensor.

11. The camshaft slider control system of claim 9 wherein the actual mode module determines that the one of the first and second pins extended when a change in the signals is greater than a predetermined value.

12. The camshaft slider control system of claim 8 wherein the actual mode module indicates that the actual exhaust mode is the one of the deactivation and non-deactivation modes when the one of the first and second pins extended in response to the command to extend the one of the first and second pins.

13. The camshaft slider control system of claim 8 wherein the actual mode module determines the one of the first and second pins to extend based on the last stored indicator of the exhaust mode command.

14. A camshaft slider control method for an engine of a vehicle, comprising:
selectively setting an intake mode command to one of: a deactivation mode; a low lift mode; and a high lift mode;
based on the intake mode command:
selectively extending a first pin of a first slider actuator into a first groove of a first grooved member of an intake camshaft slider, wherein contact between the first pin and the first groove during rotation of an intake camshaft slides the intake camshaft slider in a first direction axially along the intake camshaft; and
selectively extending a second pin of a second slider actuator into a second groove of a second grooved member of the intake camshaft slider, wherein contact between the second pin and the second groove during rotation of the intake camshaft slides the intake camshaft slider in a second direction axially along the intake camshaft;
determining a last stored indicator of the intake mode command;
commanding extension of one of the first and second pins to slide the intake camshaft slider and achieve the last stored indicator of the intake mode command;
based on whether the one of the first and second pins extended in response to the command, indicating that an actual intake mode is either: (i) the last stored indicator of the intake mode command; or (ii) another one of the deactivation, low lift, and high lift modes; and
updating the intake mode command to the actual intake mode.

15. The camshaft slider control method of claim 14 further comprising determining whether the one of the first and second pins extended based on signals from at least one sensor associated with the one of the first and second pins.

16. The camshaft slider control method of claim 15 wherein the at least one sensor includes at least one of a Hall Effect sensor and a back electromagnetic force (EMF) sensor.

17. The camshaft slider control method of claim 16 further comprising determining that the one of the first and second pins extended when a change in the signals is greater than a predetermined value.

18. The camshaft slider control method of claim 14 further comprising:
in response to a determination that the one of the first and second pins extended in response to the command to extend the one of the first and second pins, issuing a second command to extend the one of the first and second pins to slide the intake camshaft slider and achieve the last stored indicator of the intake mode command; and
indicating that the actual intake mode is the last stored indicator of the intake mode command when the one of the first and second pins did not extend in response to the second command to extend the one of the first and second pins.

19. The camshaft slider control method of claim 14 further comprising:
in response to a determination that the one of the first and second pins extended in response to the command to extend the one of the first and second pins, issuing a second command to extend the one of the first and second pins to slide the intake camshaft slider and achieve the last stored indicator of the intake mode command; and
indicating that the actual intake mode is the last stored indicator of the intake mode command when the one of the first and second pins did extend in response to the second command to extend the one of the first and second pins.

20. The camshaft slider control method of claim 14 further comprising determining the one of the first and second pins to extend based on the last stored indicator of the intake mode command.

21. A camshaft slider control method for an engine of a vehicle, comprising:
selectively setting an exhaust mode command to one of: a deactivation mode; a non-deactivation lift mode;
based on the exhaust mode command:
selectively extending a first pin of a slider actuator into a first groove of a grooved member of an exhaust camshaft slider, wherein contact between the first pin and the first groove during rotation of an exhaust camshaft slides the exhaust camshaft slider in a first direction axially along the exhaust camshaft; and
selectively extending a second pin of the slider actuator into a second groove of the grooved member of the exhaust camshaft slider, wherein contact between the second pin and the second groove during rotation of the exhaust camshaft slides the exhaust camshaft slider in a second direction axially along the exhaust camshaft;
determining a last stored indicator of the exhaust mode command;
commanding extension of one of the first and second pins to slide the exhaust camshaft slider and achieve the last stored indicator of the exhaust mode command;
indicating that an actual exhaust mode is the last stored indicator of the exhaust mode command when the one of the first and second pins did not extend in response to the command to extend the one of the first and second pins; and updating the exhaust mode command to the actual exhaust mode.

22. The camshaft slider control method of claim 21 further comprising determining whether the one of the first and second pins extended based on signals from at least one sensor associated with the one of the first and second pins.

23. The camshaft slider control method of claim 22 wherein the at least one sensor includes at least one of a Hall Effect sensor and a back electromagnetic force (EMF) sensor.

24. The camshaft slider control method of claim 22 further comprising determining that the one of the first and second pins extended when a change in the signals is greater than a predetermined value.

25. The camshaft slider control method of claim 21 further comprising indicating that the actual exhaust mode is the one of the deactivation and non-deactivation modes when the one of the first and second pins extended in response to the command to extend the one of the first and second pins.

26. The camshaft slider control method of claim 21 further comprising determining the one of the first and second pins to extend based on the last stored indicator of the exhaust mode command.

* * * * *